United States Patent
Visconti (10) Patent No.: US 6,497,775 B2
(45) Date of Patent: Dec. 24, 2002

(54) METHOD AND APPARATUS FOR MANUFACTURING A VEHICLE CROSS CAR BEAM OR OTHER STRUCTURAL, FUNCTIONAL ARTICLES OUT OF MULTIPLE MATERIALS WITH OPTIMUM MATERIAL UTILIZATION

(75) Inventor: Carl Henry Visconti, Clarkston, MI (US)

(73) Assignee: Delphi Technologies, Inc., Troy, MI (US)

( * ) Notice: Subject to any disclaimer, the term of this patent is extended or adjusted under 35 U.S.C. 154(b) by 51 days.

(21) Appl. No.: 09/833,190

(22) Filed: Apr. 11, 2001

(65) Prior Publication Data

US 2002/0149133 A1 Oct. 17, 2002

(51) Int. Cl.⁷ .............................................. B32B 31/16
(52) U.S. Cl. ................ 156/73.1; 156/73.5; 156/244.11; 156/245; 180/90; 280/752; 296/20
(58) Field of Search .............................. 156/73.1, 73.5, 156/242, 244.11, 245, 308.2; 180/90; 280/748, 752; 296/70, 74, 901

(56) References Cited

U.S. PATENT DOCUMENTS

| | | | |
|---|---|---|---|
| 3,767,742 A | 10/1973 | Robin | |
| RE30,759 E | * 10/1981 | Burkner | 264/118 |
| 4,797,173 A | * 1/1989 | Grob et al. | 156/498 |
| 4,893,834 A | 1/1990 | Honda et al. | 280/751 |
| 5,127,980 A | * 7/1992 | Cavin | 156/441 |
| 5,326,130 A | 7/1994 | Gedeon et al. | 280/752 |
| 5,556,153 A | 9/1996 | Kelman et al. | 296/70 |
| 5,676,216 A | 10/1997 | Palma et al. | 180/90 |
| 5,709,601 A | 1/1998 | Heck | 454/121 |
| 5,865,468 A | 2/1999 | Hur | 280/752 |
| 5,979,965 A | 4/1999 | Nishijima et al. | 296/70 |
| 6,110,037 A | 8/2000 | Yoshinaka | 454/143 |
| 6,145,880 A | 11/2000 | White et al. | 280/752 |
| 6,186,546 B1 | 2/2001 | Uhl | 280/751 |
| 6,203,092 B1 | 3/2001 | Yoshinaka | 296/70 |

FOREIGN PATENT DOCUMENTS

| | | | |
|---|---|---|---|
| DE | 3119572 | 3/1982 | |
| DE | 4228585 | 3/1994 | |
| FR | 2715600 | 8/1995 | |
| JP | 60162615 | 8/1985 | |
| JP | 11019957 | 1/1999 | |
| JP | 0960785 A2 | 12/1999 | ......... B60R/21/045 |
| JP | 2000103307 | 4/2000 | ......... B60R/21/045 |
| WO | WO 00/50292 | 8/2000 | ........... B62D/25/14 |
| WO | 0174627 | 10/2001 | |

* cited by examiner

Primary Examiner—James Sells
(74) Attorney, Agent, or Firm—Kathryn A. Marra (57) ABSTRACT

A method for manufacturing an object out of a plurality of materials having differing structural characteristics and capable of being placed in a molten state, the melted materials are deposited in an open mold having a pair of complementary mold portions. Various non-melted but possibly pre-heated structural, reinforcing, or energy absorbing materials can be placed in the mold with the melted materials. A closing force is applied to the mold and the item is removed after it has cured. According to one embodiment, a molding apparatus is provided to form a cross car beam with integral HVAC ductwork and knee energy absorbers.

21 Claims, 6 Drawing Sheets

METHOD AND APPARATUS FOR MANUFACTURING A VEHICLE CROSS CAR BEAM OR OTHER STRUCTURAL, FUNCTIONAL ARTICLES OUT OF MULTIPLE MATERIALS WITH OPTIMUM MATERIAL UTILIZATION

TECHNICAL FIELD

This invention relates generally to method for manufacturing items and more particularly to a method and apparatus for molding such items out of a plurality of materials while optimizing the specific material utilization to achieve the desired structural and functional requirements.

BACKGROUND

One method of molding an object out of a polymer is an injection molding process. Injection molding comprises injecting a quantity of polymer in a melted state into a mold die which is contoured so that the resulting molded part has a particular desired shape. The melted polymer must be forced through an opening in the mold and the mold must be compressed at the same time so that the forcing of the melted polymer through the mold cavity does not force the mold open.

The more complex the tool the harder it is to push the polymer through the tool. Moreover, if the item requires materials of differing strengths and/or consistency those items generally are molded separately and are secured at a later point in the manufacturing process.

For example, and if the item is a structural beam for a vehicle other items such as knee energy absorbers which mold a part of the structural beam are often manufactured separately. These items are then joined to the structural beam separately by a suitable process, such as welding. Because multiple molds are used and multiple components must be joined, the above-described process is time consuming and costs are increased due to the presence of multiple steps.

SUMMARY OF THE INVENTION

The present invention utilizes the molding characteristics of an extrusion deposit compression molding process (EDCM), also known as extrusion compression molding, melt compression molding, or back compression molding, to mold an item.

EDCM is an open mold process, and this feature allows for the use of specific processing techniques to combine different polymer materials and/or inserts within the same tool or mold cavity.

According to the present invention an EDCM apparatus includes at least two separate deposition units each one having an extrusion die. Each deposition unit pushes a material through the die.

The EDCM apparatus also includes a compression mold which is molded of first and second mold dies which mate with one another so as to mold an item.

The apparatus is manipulated so that the extrusion die heads are passed over the mold to thereby deposit different materials into predetermined areas of the mold cavity. For example, a first material is deposited into the required sections of the mold cavity so as to mold one portion of an item. The second material is deposited in another section to mold another portion of the item.

The first and second materials have different characteristics and provide different features to the mold. It will be appreciated that the first material and the second material may be different thermoplastics of differing resiliency, strength, flexibility etc.

In addition, the open mold process allows the extrusion deposition unit to pass over the mold area regardless of its shape. Thus, the unit deposits the required molten material within the mold thereby reducing the required amount of flow of material to fill all of the cavities of the mold.

Furthermore, it will also be appreciated that the first material may contain an amount of reinforcing material and the second material may contain an amount of reinforcing material, wherein the amount and type of reinforcing material used in the first and second materials may be the same or they may be different.

The mold is closed and the deposited materials within the mold cavity fill out the mold cavity under pressure and the mold is opened after the required cooling time. The resultant molded article includes the different materials which mold the item.

The EDCM process provides a manufacturing cost reduction which is realized due to optimal material usage. Optimal material usage is accomplished by one or more of the following alternatives: (1) a lower cost material may be used for any specific area of the part due to the application of optimum reinforcement material and placement and use of the optimum material for each function and (2) the present invention provides the ability to mold thinner sections across the structural beam as may be justified by structural analysis. Additional cost savings are achieved through lower cost tooling and reduced tonnage equipment.

The EDCM process requires lower pressures as compared to other molding processes and accordingly results in a reduction in the tonnage of force and machinery required by the process. In addition, the EDCM process allows the use of more complex molds therefore the molded item will have fewer attached parts as they can be mold directly. By eliminating or using fewer attached parts, there is reduced opportunity for squeaks and rattles and other quality deficiencies to occur.

Other advantages of the present invention are discussed herein and include improved recyclability, a reduction in production costs, and ease of manufacture.

The above discussed and other features and advantages of the present invention will be appreciated and understood by those skilled in the art from the following detailed description and drawings.

BRIEF DESCRIPTION OF THE DRAWINGS

The present invention will now be described, by way of example only, with reference to the accompanying drawings wherein.

DESCRIPTION OF THE PREFERRED EMBODIMENT

Referring to FIGS. 1–4 an extrusion deposition compression molding (EDCM) apparatus 10 is shown. The apparatus broadly performs an EDCM process or otherwise known as extrusion compression molding, or melt compression molding, or back compression molding, or compression molding of molten thermoplastic materials. The apparatus in one embodiment has a pair of extrusion/deposition units 12 and 14 mounted on a positioner 16. The positioner is preferably a programmable X-Y-Z positioner.

Figure 1:
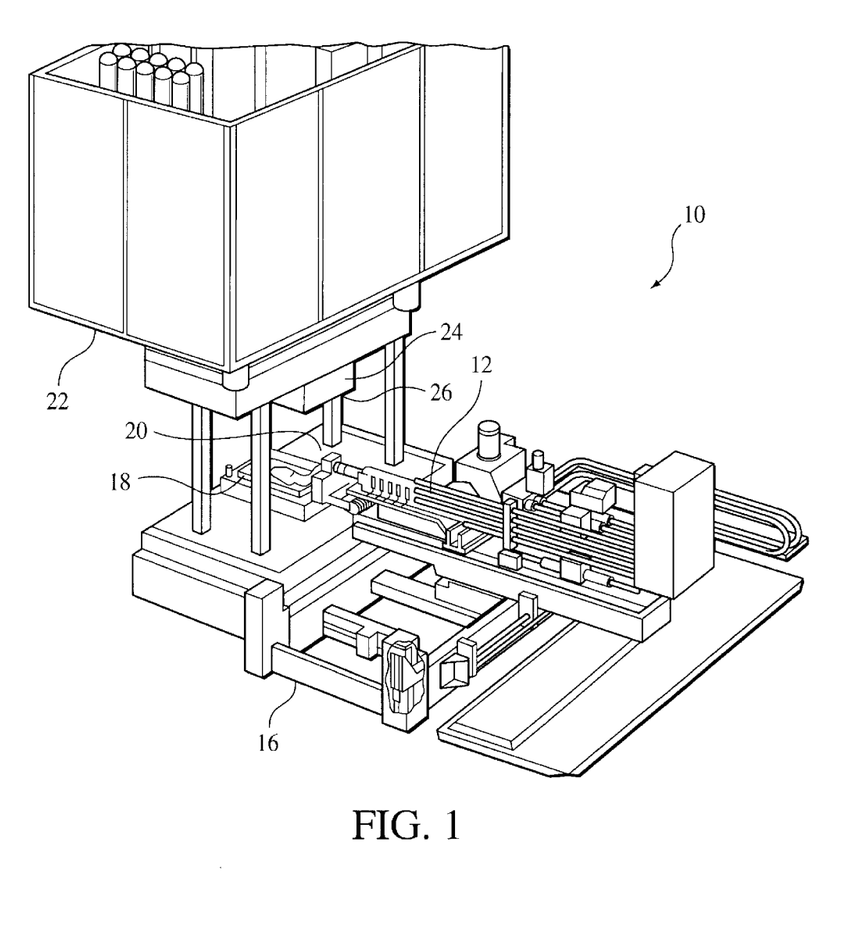
FIG. 1 is a perspective view of a molding apparatus used in an exemplary embodiment of the present invention, in this case shown with only one extrusion/deposition unit.

Positioner 16 relocates or moves the extrusion/deposition units so that a melted polymer may be disposed across a first mold cavity 18 of a mold 20. The first mold cavity embodies a portion of the shape of the item to be molded.

Molten thermoplastic is disposed into the first mold cavity from the extrusion/deposition units until the required amount of material is (or materials are) deposited within the first mold cavity. The first mold cavity is positioned and secured onto the lower platen of a press 22. Press 22 has a deployable member 24, also known as the upper platen, on which is positioned and secured a second mold cavity 26. Second mold cavity 26 is a complementary to first mold cavity 18. Accordingly, and after the molten thermoplastic is deposited within the first mold cavity, the press lowers the second mold cavity over the first mold cavity causing the deposited thermoplastic material to flow and be molded by the first and second mold cavities. It is also noted that first mold cavity 18 and second mold cavity 26 are removable so that other mold cavities can be appropriately placed to mold other objects.

In an exemplary embodiment, press 22 is a hydraulic press, however, other presses capable of lowering the second mold cavity over the first with the required amount of force are also contemplated to be within the scope of the present invention.

Press 22 exerts a force on the second mold cavity which makes contact with the exposed surface of the molten thermoplastic as well as provides a boundary for the molten thermoplastic to take form and cool or set after being deposited or disposed in the first mold cavity.

In addition, press 22 will maintain the pressure force on the materials that are being molded (typically molten thermoplastic) as the materials cool and shrink or set. Thus, there will be no deformations in the item being molded due to shrinkage or settling within the mold. This can be accomplished through the use of a thermister or other temperature measuring device to determine when the molded part has reached the proper temperature for demolding, or it can be accomplished by waiting the proper amount of time prior to demolding. In addition, or as an alternative, a pressure gauge can be positioned to measure the pressure between first mold cavity 18 and second mold cavity 26. Thus, the information from the thermister or pressure gauge or both can be supplied to a controller which will maintain or possibly increase the pressure being applied by press 22.

For example, the molten thermoplastic is generally in an expanded state when compared to its cooled or cured temperature. Thus, press 22 must apply a greater force when the molten thermoplastic is in the mold. In addition, and when the material cools, the press will have to lower the second mold cavity in order to maintain contact with the curing material.

Accordingly, a more uniform shape in the item being molded is maintained by having a continuous pressure force applied by the press. By pressing and following the materials in the mold cavity as they contract, the press also eliminates stresses and defects that may result from the shrinkage of the molten thermoplastic.

As an alternative to lowering the second mold cavity and maintaining the pressure on the cooling thermoplastic materials, the second cavity may be stopped using stop blocks at a specified component thickness. This is done when the thermoplastic material includes a blowing or foaming agent or when one of the inserted non-molten materials is compressed during the lowering of the second mold cavity, but it also can be done using only thermoplastic materials that have minimal shrink or that otherwise do not result in problems due to shrinkage.

As a further alternative, the second mold cavity 26, after being lowered onto the first mold cavity 18, can be lifted away from the melted thermoplastic a minimal amount and lowered again, and this can be done several times during the cycle of molding a part.

Figure 2:
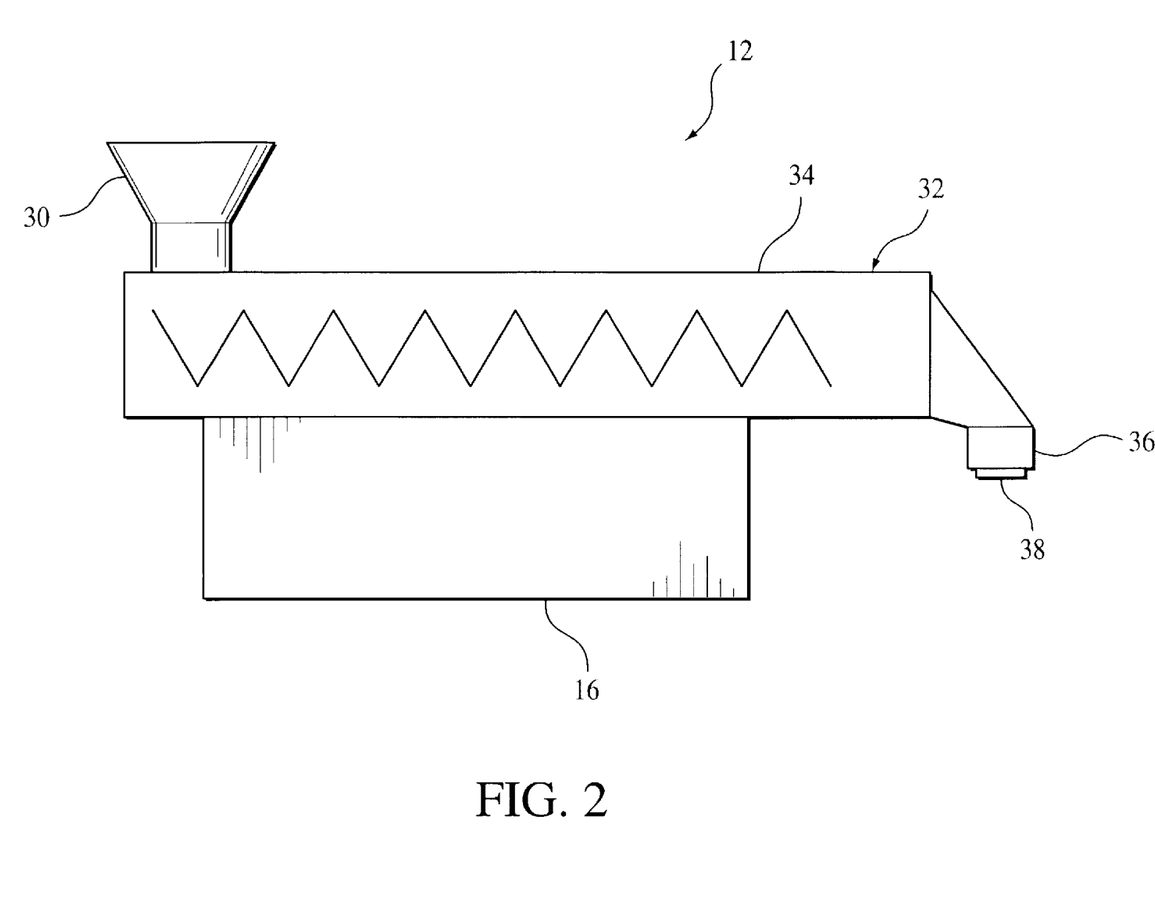
FIG. 2 is a simplified side view of an extrusion/deposition unit for use in the apparatus of FIG. 1.

Referring now to FIG. 2, an extrusion/deposition unit is shown. In an exemplary embodiment, two extrusion/deposition units are mounted on the positioner. Of course, additional extrusion/deposition units may be used depending on the number of different materials needed to mold the item. The velocity of the movement of the extrusion/deposition unit can vary the quantity of molten thermoplastic or molten polymer deposited. The extrusion/deposition unit can also vary the quantity of molten polymer by the rate of injection.

The extrusion/deposition unit has a feed element 30. Feed element 30 provides an opening for receiving a polymer to be heated and deposited by the extrusion/deposition unit. Typically the polymer is in pelletized form and is melted by a heating element disposed within the unit and by the shear force provided within the plastication unit 32. As an alternative, a separate extruder could be used to feed melted thermplastic into the extrusion/deposition unit, and this extruder could be fed by plastic pellets and/or fiber materials.

The extrusion/deposition unit has a plastication/injection unit 32 is configured to receive the materials from feed element 30. Plastication/injection unit 32 has a plurality of internal components within a barrel portion 34. The plurality of internal components include but are not limited to the following: a screw or screws for receiving the pelletized polymers and additional fibers for reinforcement, the screws mix and arrange and apply shear force to the pelletized polymer; a plurality of heating bands for heating and melting the pelletized polymer and a hydraulic piston/ram for forcing the screw forward and thereby forcing the molten polymer out of an extrusion die opening 36. The amount of distance that the hydraulic piston and screw move forward determines the overall amount of melted thermoplastic deposited onto the mold cavity, and the speed of the hydraulic piston/screw movement determines the flow rate of the material. The size to die opening will also affect the shape of the molten polymers.

The extrusion die opening can be configured to have a fixed opening of most any shape. For example, the fixed opening may be a circle, rectangle, triangle, star etc. Alternatively, a slidable number 38 with a plurality of variable openings can be positioned to provide alternative openings for each issue die opening 36.

The extrusion/deposition unit conveys the molten plastic materials to the extrusion die opening and can provide a means for metering the amount of molten polymer out of the extrusion die opening and accordingly onto the mold cavity. In addition, the amount of molten polymer that is deposited within the mold cavity may be varied by the overall amount movement of the hydraulic ram. The localized amount of material deposited can be varied by the speed of the hydraulic ram and positioner.

Figure 3:
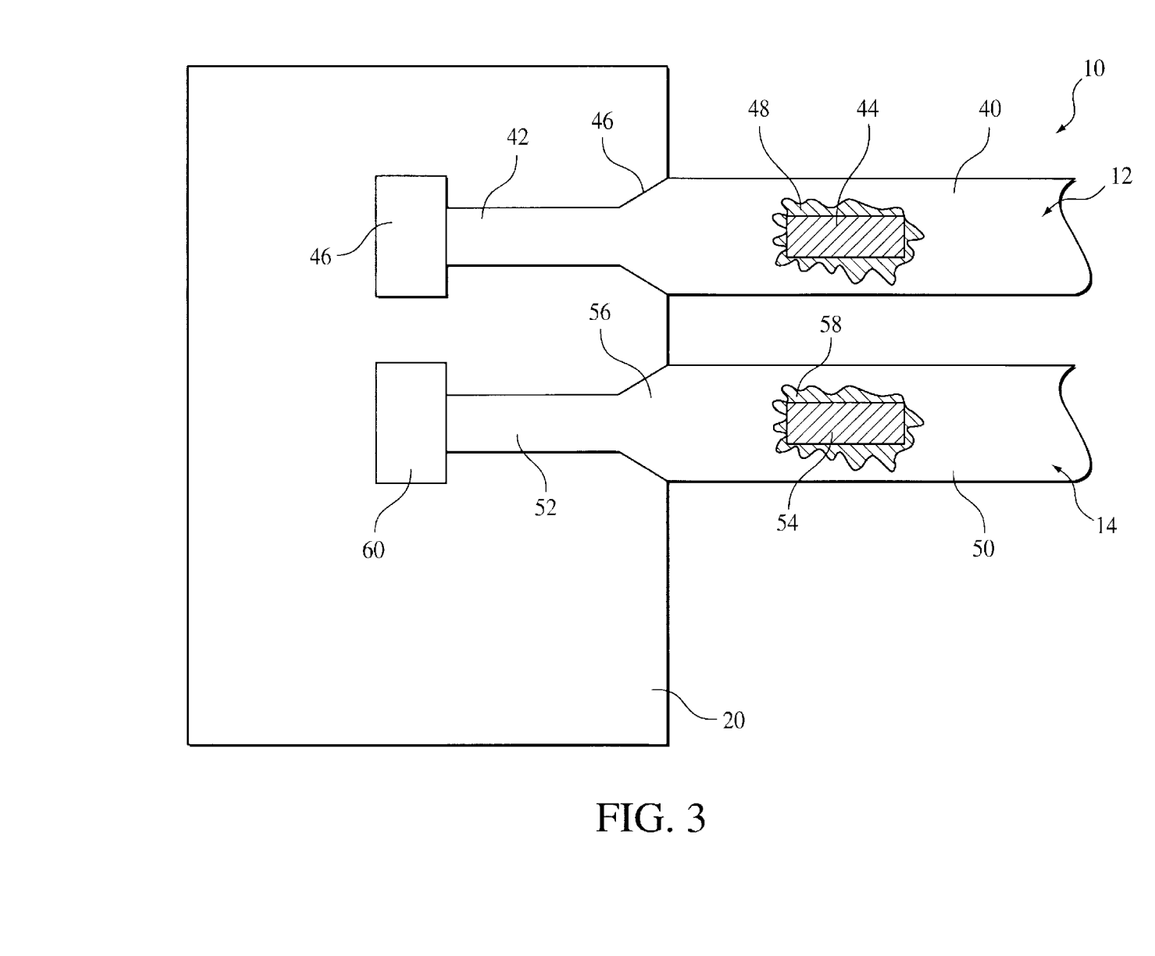
FIG. 3 is a top plan view of an exemplary molding apparatus for use in the manufacturing disclosed herein.

Referring now to FIG. 3, portions of apparatus 10 are shown. Here, the apparatus broadly comprises an extrusion compression molding apparatus (or EDCM or back compression molding) and according to one embodiment of the present invention, the apparatus comprises a first extrusion/deposition unit 12 and a second extrusion/deposition unit 14.

An alternative type of extrusion/deposition unit 12 and 14 can consist of a cylindrical plunger with a similar extrusion die. This plunger unit can be fed molten plastic material, with or without fiber reinforcement or other additives, from a separate extruder. Plastic pellets and/or fiber materials are fed into the extruder. By moving the ram of the plunger forward, melted thermoplastic can be forced out of the extrusion die, and the amount of movement and the speed of the movement can be used to control the amount of material and flow rate as required.

As another alternative method to an apparatus that includes two extrusion/deposition units that deposit the molten plastic onto the first mold cavity, one or both of the extrusion/deposition units can deposit or extrude a specific volume of material onto a conveyor or other platform, and this deposited/extruded material can then be transferred using a robot or other method of automated transfer to the first mold cavity.

The first extrusion/deposition unit 12 includes a barrel section 40 having an inlet section (not shown) and an opposing outlet section 42. The barrel section 40 contains an injection/plastication screw, partially indicated at 44, which longitudinally extends the length of the barrel section 40. The illustrated first extrusion/deposition unit 12 further has a neck section 46 that is formed between the barrel section 40 and the outlet section 42. The injection/plastication screw 44 is rotatably mounted within the barrel section 40 and is designed to advance polymeric material through the barrel section 40 at elevated temperatures and under pressure which causes the polymeric material to become a polymer melt.

Typically, the injection/plastication screw 44 has a number of flights which are usually wrapped in a helical manner around the body of the injection/plastication screw. The polymeric material is generally introduced into the first extrusion/deposition unit 12 in a solid form, such as plastic pellets, and then the rotational movement of the injection/plastication screw 44 and the flights causes the polymeric material to be conveyed within the barrel section 40 toward the outlet section 42 and through a heated compacted environment where the material is heated under carefully controlled conditions to melt the polymeric material (to form a melt 48) and the material is mixed to a reasonably uniform temperature while the melt is pressurized and pumped forward toward the outlet section 42.

A first extrusion die 46 is connected to the outlet section 42 and includes a die channel (not shown) included therein. The die channel fluidly communicates with the outlet section 42 so that the melt advances through the outlet section 42 and into the die channel. One end of the die channel thus comprises a deposit opening in which the melt (extrudate) is discharged through. The first extrusion die 46 and more specifically, the die channel may have any number of shapes so that the stream of extrudate which exits the first extrusion/deposition unit 12 has a desired shape. The extrusion die 46 is not always the same dimension. The extrusion die 46 may change in order to match the varying composition across the part (e.g., larger openings for larger mold areas).

It will be appreciated that a reinforcing material may be added to the melt at any number of locations along the first extrusion/deposition unit 12 so as to form a fiber-reinforced extrudate. Alternatively, the reinforcing fiber may be already in the plastic pellets. This is particularly advantageous when it is desired to further enhance or alter the material and/or performance characteristics of the extrudate.

As will be described in greater detail hereinafter, certain portions of the resultant molded structure produced by the present process require different material characteristics than other portions of the structure. For example, the manufacture of one portion may require additional fiber reinforcement because it is desired to increase the structural properties of this one portion of the structure. It is within the scope of the present invention that any number of suitable fibers may be used as the reinforcing material. While it may be possible to manufacture the entire article out of a single material, this may not always be the most optimal, cost effective method. The use of the material with the highest reinforcement across the entire article, for example can result in reinforcement where it is not required and special design considerations where more energy absorption is required.

In the illustrated embodiment, the second extrusion/deposition unit 14 is similar to the first extrusion/deposition unit 12 and is spaced apart therefrom. It will be appreciated that the second extrusion/deposition unit 14 does not necessarily have to be identical or similar to the first extrusion/deposition unit 12 so long as both the first and second extrusion/deposition units 12, 14 are intended for use in an extrusion deposit compression molding process.

According to the present invention, the first and second extrusion/deposition units 12, 14 are each designed to move in the x, y, and z directions so that each of the first and second extrusion/deposition units 12, 14 may be properly positioned relative to a first mold die which is generally indicated at 18. The designations of x, y, and z are typical of any three-axis movement, with x being into and out of the press space, y being lateral movement with respect to the x axis, and z being vertical with respect to the x axis. In a simplified version of this invention, the first and second extrusion/deposition units 12, 14 can be designed to move only the in x direction or only in the x and z directions or x and y directions. For simplicity, the first mold die 18 is not shown in detail and FIG. 3 is intended to convey the spatial relationship between the first mold die 18 and the first and second extrusion/deposition units 12, 14. The first and second extrusion/deposition units may be connected to one another so that movement of one causes the simultaneous movement of the other or each of the first and second extrusion/deposition units 12, 14 may move independent from the other.

The second extrusion/deposition unit 14 is similar to unit 12 in that it includes a barrel section 50 having an inlet section (not shown) and an opposing outlet section 52. The barrel section 50 contains an injection/plastication screw, partially indicated at 54. The illustrated second extrusion/deposition unit 14 further has a neck section 56 formed between the barrel section 50 and the outlet section 52. The injection/plastication screw 54 is rotatably mounted within the barrel section 50 and is designed to advance polymeric material through the barrel section 50 at elevated temperatures and under pressure which causes the polymeric material to become a polymer melt generally indicated at 58. Typically, the injection/plastication screw 50 has a number of flights which are usually wrapped in a helical manner around the body of the injection/plastication screw.

A second extrusion die 60 is connected to the outlet section 52 and includes a second die channel (not shown) formed therein. The second die channel fluidly communicates with the outlet section 52 so that the melt advances through the outlet section 52 and into the second die channel. One end of the second die channel thus comprises a deposit opening in which the melt (extrudate) is discharged through. The second extrusion die 60 and more specifically, the second die channel, may have any number of shapes so that the stream of extrudate which exits the second extrusion/deposition unit 14 has a desired shape. It will be appreciated that a reinforcing material may be added to the melt at any number of locations along the second extrusion/deposition unit 14 including in the pellets so as to form a fiber-reinforced extrudate.

Because the molding apparatus 10 includes first and second extrusion/deposition units 12, 14 each having a separate extrusion/deposition head, namely first and second extrusion dies 46, 60, respectively, each extrusion/deposition unit 12, 14 may contain a different polymer material used to form the extrudate and furthermore the type and/or amount of reinforcing fiber may be varied between the first and second extrusion/deposition units 12, 14. There may be two different materials in the same mold die 18.

Thus according to the present invention, the first extrusion/deposition unit 12 may be used to deposit a first extrudate in the mold die 18 and the second extrusion/deposition unit 14 may be used to deposit a second extrudate in the mold die 18. This results in the ability of the operator to tailor the construction of the resultant molded article.

Figure 4:
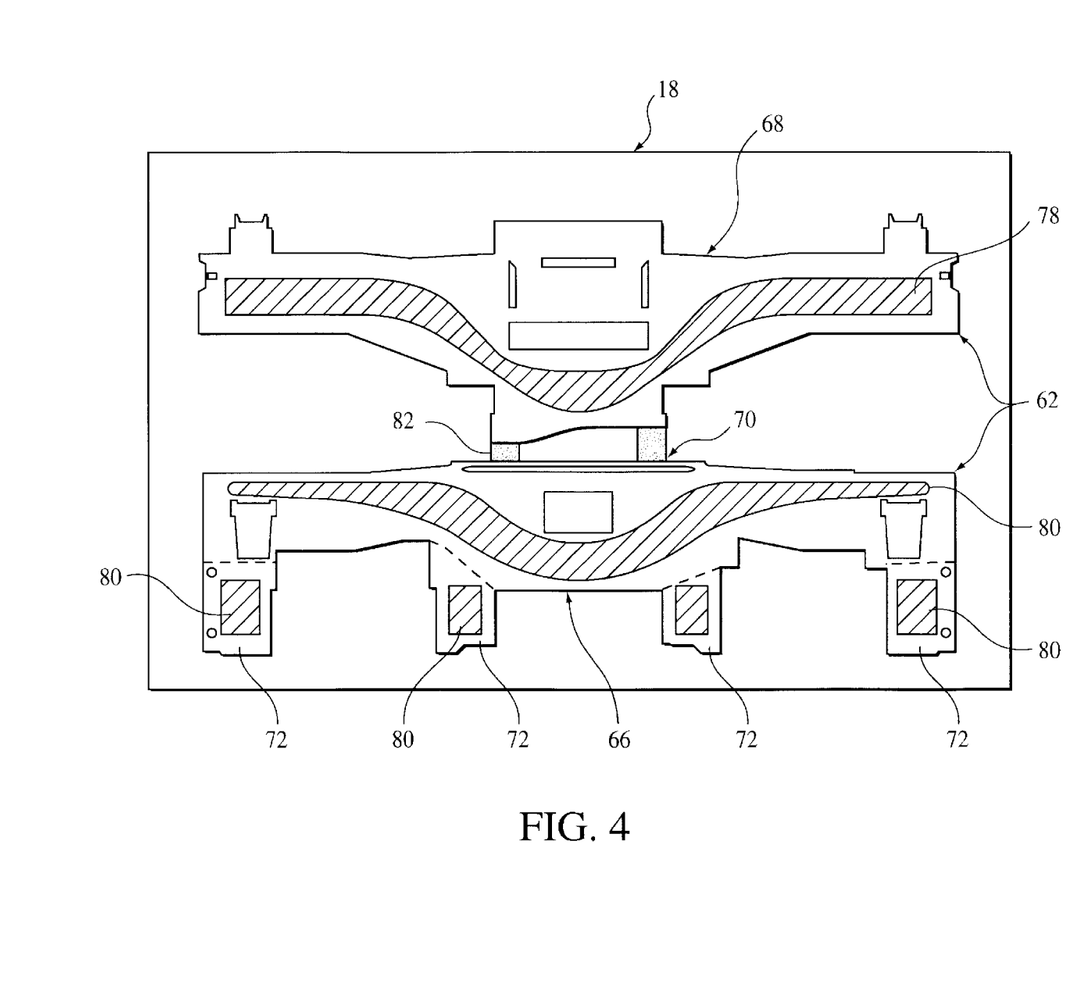
FIG. 4 is a top plan view of a mold portion for use with the molding apparatus of FIGS. 1–3.
Figure 5:
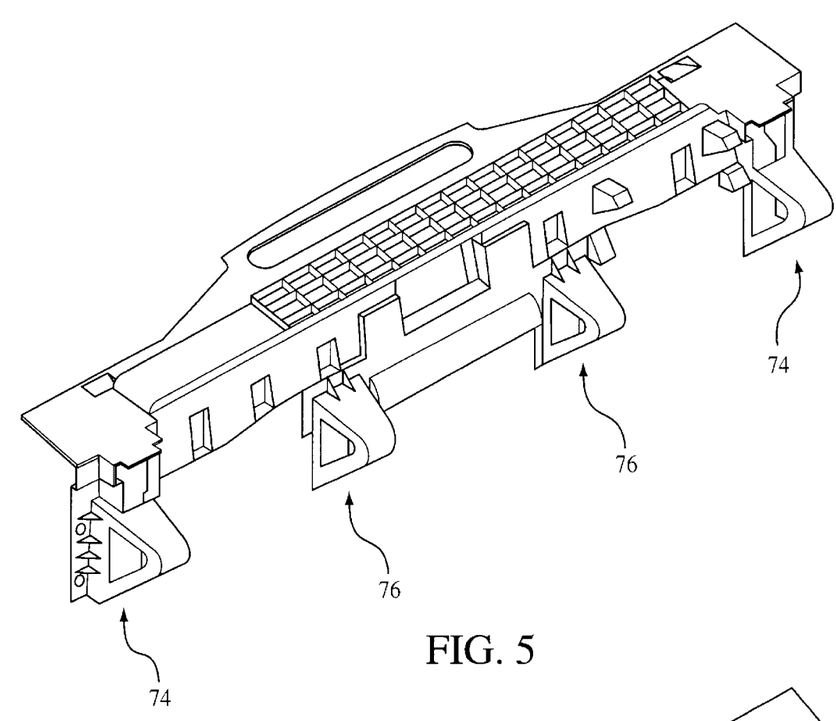
FIGS. 5 and 6 are perspective views of items molded by the process of an exemplary embodiment of the present invention.

Referring now to FIGS. 3 and 4. FIG. 4 is a top plan view of one configuration of first mold die 18. In a compression molding process, the mold is formed of two complementary parts, namely the first mold die 18 and a 10 second mold die (not shown) which mates with the first mold die 18 under compressive forces so as to fill-out the first and second molds with the extrudate. In an extrusion deposit compression molding process, the extrudate is deposited onto the first mold die 18 and then the first and second mold dies are closed and compressed under pressure.

Figure 6:
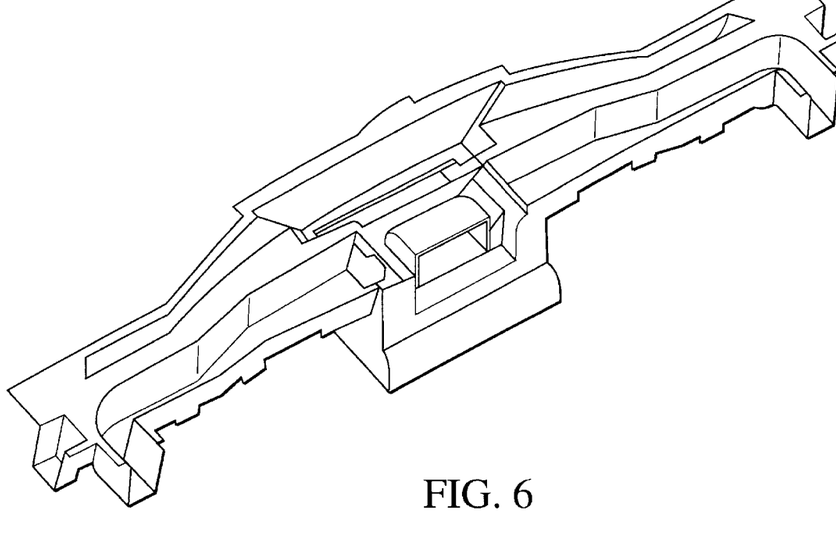

Referring now to FIGS. 4 and 6, the first mold die 18 shown in FIG. 4 includes a cavity, generally indicated at 62, for receiving one or more extrudates from the first and second extrusion/deposition units 12, 14. The cavity 62 generally has the shape of the resultant molded article so that compression of the first and second mold dies under pressure results in the molded article being produced and in this case the molded article is the Integrated Structural HVAC System (ISHS) shown in FIG. 6. Of course, the process disclosed herein may mold any item of any configuration.

The cavity 62 actually is formed of a first section 66 and a second section 68 with a hinge section 70 being formed therebetween. For some designs, the cavity 62 may actually be molded of three separate sections. In addition, these sections could actually be individual mold cavities mounted together in one press or in separate presses. More specifically, the first section 66 is formed of a recessed section of the first mold die 18 which is in the shape of the first section 12 of the ISHS 64 and the second section 68 of the first mold die 18 is in the shape of the second section 14 of the ISHS 64. The hinge section 70 comprises one or more recessed portions of the first mold die 18 which link the first section 66 with the second section 68 and thus these recessed portions comprise hinge sections as will be explained further.

In this cavity, the first section 66 of the first mold die 18 also includes a plurality of third sections 72 which are configured in the shape of the first knee energy absorbers 74 and second knee energy absorbers 76.

In manufacturing ISHS 64 using apparatus 10, it may be desired to mold ISHS 64 using a first material, while the first and second knee energy absorbers 74, 76 are molded using a second material. In some applications it may be desired and it is clearly within the scope of the present invention that the ISHS including the first and second knee energy absorbers 74, 76 are molded entirely of the first material. However, the resultant molded article in the form of ISHS 64 may not always be a cost or weight effective molded product.

In addition, in manufacturing ISHS 64 using apparatus 10, it may be desired to mold sections 66 and 68 without the hinge material 70. In this case, the two sections 66 and 68 would be molded, positioned relative to each other, and joined using traditional methods.

This is partially due to the fact that ISHS 64 may have structural requirements which are partially dictated by the type of material used to mold these members, while the first and second knee energy absorbers have safety and energy absorption requirements. Therefore, it may be more advantageous to use two separate materials having different characteristics to mold the complete ISHS 64 structure.

One exemplary process for manufacturing an item such as ISHS 64 will now be described with reference to FIGS. 1–7. With the first mold die 18 being opened relative to the second mold die (not shown), a first material, generally indicated at 78, is fed into the first extrusion/deposition unit 12 and a second material, generally indicated at 80, is fed into the second extrusion/deposition unit 14. The first and second materials may comprise any number of suitable polymeric materials that are suitable for use in an extrusion deposit compression molding process. Preferably the first and second materials each comprise a thermoplastic material. The first and second materials may comprise the same or different thermoplastic materials. In addition, a reinforcing material may be added to one or both of the first and second extrusion/deposition units 12, 14 so that a reinforced melt is formed in the respective device during operation thereof. Any number of suitable reinforcing fiber materials may be introduced into the first extrusion/deposition unit 12 and/or the second extrusion/deposition unit 14. For example, glass fibers or natural fibers or synthetic fibers may be introduced to form the fiber-reinforced polymer melt.

The hinge sections 70 of the first mold die 18 are designed to receive a member or material which serves as a hinge and in one embodiment, several combination hinge-seal pieces, generally indicated at 82, molded from a low-cost elastomeric material are inserted into the cavity 62 at the hinge sections 70. As an alternative to using separate hinge-seal pieces 82, a third material may be deposited into the hinge sections 70. In this embodiment, the third material would preferably comprise a material which is more elastic than either of the first or second materials or it could be molded of one of the first and second materials without reinforcement.

Yet another alternative is to provide a natural hinge area by depositing a thin layer formed of either the first or second material. As will be described hereinafter, this thin layer of material would serve as a hinge because the hinge sections 70 connect the first and second sections 66, 68 and therefore permit the sections 66, 68 to be hingedly folded over relative to one another.

The first extrusion/deposition unit 12 is positioned relative to the first mold die 18 so that the first die 46 is generally orientated above the cavity 62 so that the first material is deposited into preselected portions of the cavity 62. For example and according to one exemplary embodiment, the first material is deposited into the first and second sections 66, 68 of the cavity 62, which correspond to the first and second sections, of the ISHS 64 shown in FIG. 6 absent the knee energy absorbers 74, 76. Therefore, the use of a separate extrusion die head (first extrusion die 46) permits the structural members of the ISHS 64 to be molded of the first material which preferably includes a reinforcing material compounded therewith. For example, the first material may comprise a highly glass, natural fiber or otherwise reinforced thermoplastic material which provides the desired structural requirements for the first and second sections of the ISHS.

It will be appreciated that if different amounts of reinforcing materials or different reinforcing materials are desired in different areas of the cavity 62, the material type or type of reinforcing material may be changed at the first extrusion die head 46. This permits the user to tailor the construction of the ISHS 64 so that the structural elements thereof are formed of suitable materials which may be different from one another. Because, the first extrusion/deposition unit 12 is mounted and designed to move in the x, y, and z directions, the first extrusion die head 46 may be positioned over all area of the cavity 62 so as to permit the first material (first extrudate) to be deposited into the preselected portions of the cavity 62.

According to the present invention, the second extrusion/deposition unit 14 and more specifically, the second extrusion die head 60. is either driven independently from the movement of the first extrusion/deposition unit 14 or simultaneously with the movement therewith. In either case, the second extrusion die head 60 is positioned above second preselected areas of the cavity 62 for depositing the second material into these preselected areas. Preferably, the preselected areas of the cavity 62 in which the second material is deposited comprise the plurality of third sections 70 of the cavity 62. The plurality of third sections 70 is shaped to form the knee energy absorbers 74, 76. Accordingly, the second material comprises a material which is preferably selected so that it provides the desired material characteristics for the construction of knee energy absorbers 74, 76. The second material may be formed of the same or different thermoplastic with a different amount of reinforcing material relative to the amount of reinforcing material within the first material. It will also be appreciated that the type of reinforcing material itself which is used in the second material may be different than the type of reinforcing material used in the first material.

It being understood that because the knee energy absorbers 74, 76 have a different function compared to the remaining portions of the ISHS 64, the second material is carefully selected so that the knee energy absorbers 74, 76 satisfy safety and energy absorption requirements for the same. Because the present invention provides a process and apparatus 10 which permits the ISHS 64 to be constructed using two or more materials in one exemplary embodiment, the present invention provides advantages over the conventional processes which use one material to mold the entire molded structure or use different materials but require a number of different processing steps.

For additional stiffness/strength of the item being manufactured, a woven material, random mat, metal piece or some other type of reinforcing material (not shown) is loaded into the first material or this material may have been previously loaded onto the mold core, e.g., cavity 62. Accordingly, the item formed in the first and second sections 66, 68 of the cavity 62 are provided with additional strengthening material. It is also within the scope of the present invention that additional energy absorbing capability and/or mass reduction in the knee energy absorbers 74, 76 (the third sections 70 of the cavity 62) a honeycomb material or expanded polypropylene (EPP) slabs (not shown) are loaded into the second material or have been previously loaded onto the mold cavity 62 and more specifically, in the third sections 70 thereof. This results in additional tailoring of the construction of the ISHS 64.

The mold is then closed and preferably spring-loaded core extensions contact the combination hinge-seal pieces prior to full mold closure. As the mold is closed, the first and second materials (and the third material if used) are compressed and fill out the respective sections of the cavity 76 under pressure. Typically, the materials are deposited into the mold in slight excess so as to ensure that the materials completely fill out the mold. The material keeps the tools apart. When the material shrinks, the mold will follow the material down under pressure until the tools join. The material contraction can create stresses in the part. The constant pressure on the material by the mold will reduce the stresses of the formed object.

Accordingly, a stress free part is capable of being produced. It will be appreciated that because the sections of the ISHS are connected by material deposited within the hinge sections 70, the ISHS comprises a one-piece molded structure. After an appropriate cooling period, the mold is opened and the one piece integrally molded ISHS 64 is removed from the mold using appropriate techniques.

As previously mentioned, the first section of the ISHS 64 is designed to complementarily mate with the second section to form the assembled ISHS 64. Accordingly, the first section of the ISHS 64 formed in the first section 66 of the cavity 62 is folded over about the hinge-seal pieces 82 thereof and mates with the second section formed in the second section 68 of the cavity 62. The first and second sections are securely joined to one another using conventional processing techniques. In one exemplary embodiment, a welding process is used. For example, a vibration welding process may be used to securely join the first and second sections of, respectively, to form ISHS 64. Other suitable techniques include but are not limited to the use of adhesives and ultrasonic welding to name a few.

Figure 7:
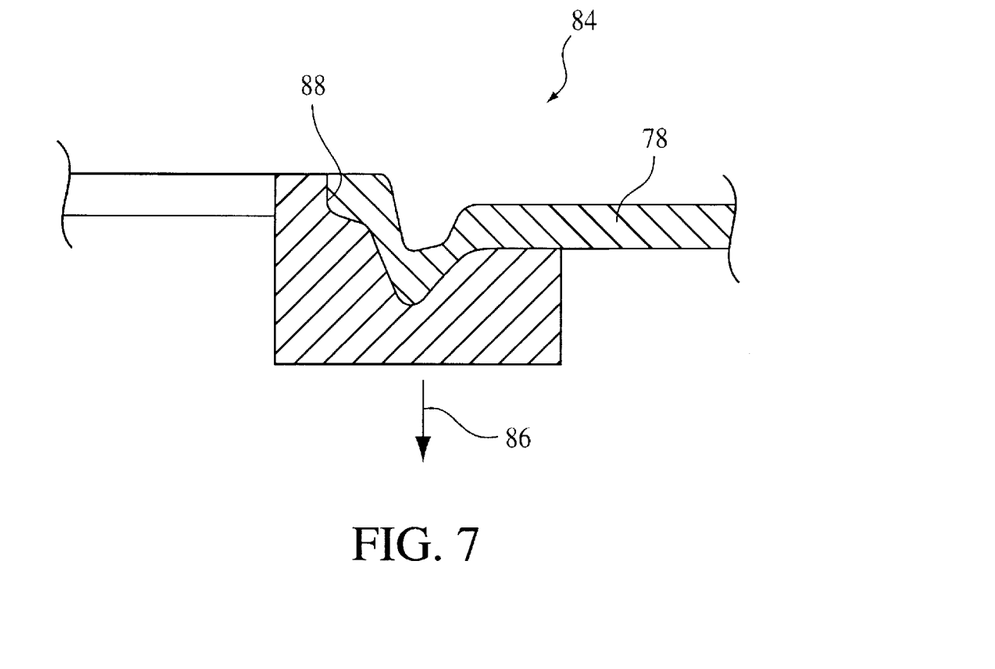
FIG. 7 is a cross-sectional side elevational view of an optional mold slide in a first position.
Figure 8:
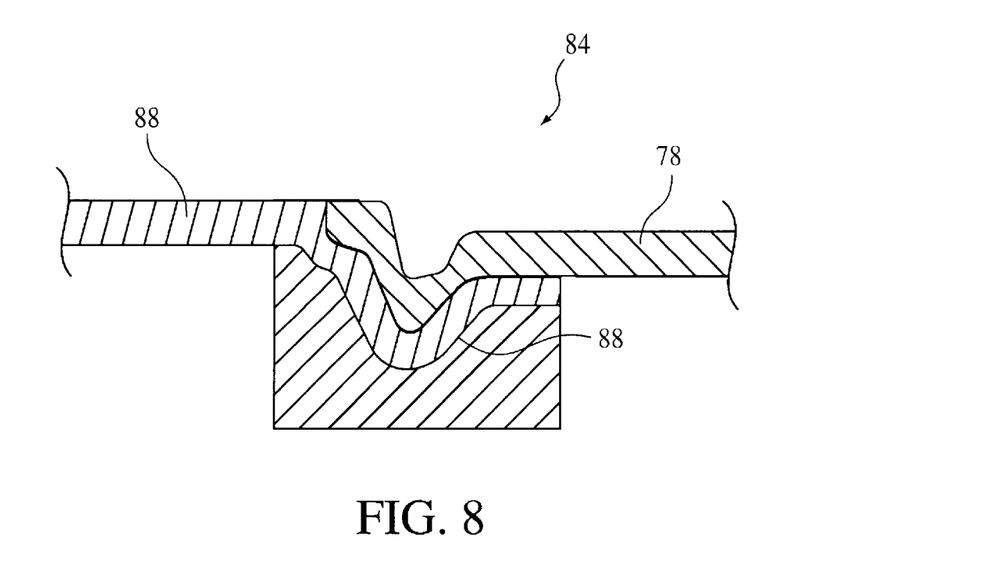
FIG. 8 is a cross-sectional side elevational view of the mold slide of FIG. 7 in a second position.

Referring now to FIGS. 7 and 8 in which an optional movable mold slide is shown and generally indicated at 84. The mold slide 84 is intended for use in cavity areas which require the overlap of two polymer materials, such as the first and second materials 78, 80 mentioned hereinbefore. The movable mold slide 84 is optionally used to separate mold areas which receive different mold materials, e.g., the first and second materials. The movable mold slide 84 is designed to move from a first position shown in FIG. 7 to a second position shown in FIG. 8 and moves in the direction of arrow 86. In the extended first position, the mold slide 84 has a contoured surface 88 which is designed to partially shape the molded structure formed of the first material which is deposited onto the contoured surface 88.

FIG. 8 shows the mold slide 84 in the second retracted position in which a space is formed between the first material and the contoured surface 88. This space is for receiving the second material which is deposited onto the contoured surface 88 generally below the first material. Thus, there is an overlap of the first and second polymer materials in at least a portion of the mold. This may be desired where the formed molded structure, e.g., the ISHS 64, has areas in which the use of two different materials is desired. For example, one area of the ISHS 64 may be constructed having overlapping polymer materials which each have different reinforcing material characteristics so as to tailor the ISHS 64 in this overlapping area to have certain structural and/or performance properties.

It will be appreciated that the structural beam illustrated herein is merely illustrative of just one type of item manufactured by the process disclosed herein.

Thus, there are numerous designs that the molded item may have according to the present invention.

While the invention has been described with reference to an exemplary embodiment, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

What is claimed is:

1. A process for producing an object, comprising:
    providing a molding apparatus having first and second extrusion die heads;
    providing a mold formed of a first mold die and a complementary second mold die, the first mold die having a mold cavity formed therein, the mold cavity having multiple cavity sections formed therein; one cavity section corresponding to a first structural functional component and at least one other cavity corresponding to a second structural functional component, said second structural functional component having different energy absorption characteristics than said first structural functional component;
    introducing a first material into the molding apparatus so that the first material is processed into a first melt and exits the molding apparatus through the first mold die;
    depositing the first melt into the cavity section corresponding to first structural functional component;
    introducing a second material into the molding apparatus so that the second material is processed into a second melt and exits the molding apparatus through the second mold die;
    depositing the second melt into the cavity section corresponding second structural functional component; and
    closing the first and second mold dies under pressure to mold the object.

2. The process of claim 1, wherein the molding apparatus includes first and second extrusion/deposition units, the first extrusion/deposition unit including the first extrusion die head, the second extrusion/deposition unit including the second extrusion die head.

3. The process of claim 1, wherein the mold cavity is formed of a first cavity section which corresponds to a first subcomponent of said first structural functional component and, a second cavity section which corresponds to a second subcomponent of said second structural functional component, and a third section which corresponds to an energy absorbing component, the first and second subcomponents complementarily mating with each other to form said object.

4. The process of claim 3, further comprising:
    depositing at least one hinge member in at least one hinge section formed in the mold cavity, the at least one hinge section connecting the cavity sections corresponding to said first and second structural functional components.

5. The process of claim 1, wherein the first material comprises a thermoplastic having a first reinforcing material disposed therein.

6. The process of claim 5, wherein the second material comprises the same thermoplastic used in the first material, the second material having a second reinforcing material which differs from the first reinforcing material.

7. The process of claim 5, wherein the second material comprises a different thermoplastic than the thermoplastic used in the first material, the second material having a second reinforcing material which is the same as the first reinforcing material.

8. The process of claim 5, wherein the second material comprises a different thermoplastic than the thermoplastic used in the first material, the second material having a second reinforcing material which differs from the first reinforcing material.

9. The process of claim 4, further comprising:
    removing the object;
    folding the first and second structural functional components relative to each other about the hinge member; and
    joining the first and second structural functional components.

10. The process of claim 9, wherein said first and second structural functional components are joined by a process selected from the group consisting of an adhesive process, an ultrasonic welding process and a vibration welding process.

11. The process of claim 1, further comprising:
    depositing a fourth material with the first material for providing additional stiffness/strength for said object.

12. The process of claim 11, wherein the fourth material comprises a material selected from the group consisting of a woven material, a random mat, and a metal piece.

13. A process for producing a one-piece structural cross beam, comprising:
    providing a molding apparatus having first and second extrusion die heads;
    providing a mold formed of a first mold die and a complementary second mold die, the first mold die having a mold cavity formed therein, the mold cavity having multiple cavity sections formed therein, at least one cavity section corresponding to the structural cross beam;
    introducing a first material into the molding apparatus so that the first material is processed into a first melt and exits the molding apparatus through the first extrusion die;
    depositing the first melt into the mold cavity in select areas for forming the structural cross beam;
    introducing a second material into the molding apparatus so that the second material is processed into a second melt and exits the molding apparatus through the second extrusion die;

depositing the second melt into the mold cavity in select area for forming the structural cross beam; and closing the first and second mold dies under pressure to form the vehicle structural cross beam.

14. A process for producing a one-piece structural cross beam having integral ducting, comprising:

providing a molding apparatus having first and second extrusion die heads;

providing a mold formed of a first mold die and a complementary second mold die, the first mold die having a mold cavity formed therein, the mold cavity having multiple cavity sections formed therein, at least one cavity section corresponding to the structural cross beam;

introducing a first material into the molding apparatus so that the first material is processed into a first melt and exits the molding apparatus through the first extrusion die;

depositing the first melt into the mold cavity in select areas for forming the structural cross beam with integral ducting;

introducing a second material into the molding apparatus so that the second material is processed into a second melt and exits the molding apparatus through the second extrusion die;

depositing the second melt into the mold cavity in selected areas for forming the structural cross beam with integral ducting; and closing the first and second mold dies under pressure to form the vehicle structural cross beam having integral ducting.

15. The process as in claim 14, wherein said one-piece structural cross beam includes knee energy absorbers which are integral with the structural cross beam and at least one other cavity section of said mold cavity sections corresponding to said knee energy absorbers, the second melt is deposited in a selected area for forming the knee energy absorbers which are integral with the structural cross beam with integral ducting.

16. The process as in claim 13 wherein said one-piece structural cross beam includes knee energy absorbers which are integral with the structural cross beam and at least one other cavity section of said mold cavity sections corresponding to said knee energy absorbers, the second melt is deposited in a selected area for forming the knee energy absorbers which are integral with the structural cross beam.

17. The process as in claim 14, wherein the integral ducting is defined by the first and second cavity sections.

18. The structural cross beam of claim 14, wherein the structural cross beam is for receipt in a vehicle.

19. The structural cross beam of claim 13, wherein the structural cross beam is for receipt in a vehicle.

20. The structural cross beam of claim 15, wherein the structural cross beam is for receipt in a vehicle.

21. The process as in claim 15, wherein the integral ducting is defined by the first and second cavity sections.

* * * * *